United States Patent
Irwin

(10) Patent No.: US 6,398,686 B1
(45) Date of Patent: Jun. 4, 2002

(54) ELECTRONICALLY CONTROLLED LIMITED SLIP DIFFERENTIAL ASSEMBLY

(75) Inventor: Earl James Irwin, Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/643,232

(22) Filed: Aug. 22, 2000

(51) Int. Cl.[7] .......................... F16H 48/30; F16H 48/22
(52) U.S. Cl. .................. 475/150; 192/84.6; 192/93 A; 475/231
(58) Field of Search ............... 192/84.6, 93 A; 475/231, 150

(56) References Cited

U.S. PATENT DOCUMENTS

| | | | |
|---|---|---|---|
| 4,462,272 A | * | 7/1984 | Roper ..................... 475/240 |
| 4,662,861 A | | 5/1987 | Seung et al. |
| 4,805,486 A | | 2/1989 | Hagiwara et al. |
| 4,950,214 A | | 8/1990 | Botterill |
| 5,080,640 A | | 1/1992 | Botterill |
| 5,092,825 A | | 3/1992 | Goscenski, Jr. et al. |
| 5,106,349 A | | 4/1992 | Botterill et al. |
| 5,279,401 A | | 1/1994 | Stall |
| 5,732,594 A | | 3/1998 | Janson et al. |
| 6,290,623 B1 | * | 9/2001 | Morse ..................... 475/231 |

FOREIGN PATENT DOCUMENTS

JP          8-105512    *   4/1996

* cited by examiner

Primary Examiner—Rodney H. Bonck
(74) Attorney, Agent, or Firm—Liniak, Berenato, Longacre & White

(57) ABSTRACT

A novel arrangement of an electronically controlled limited slip differential assembly including a friction clutch assembly provided within a differential case for selectively restricting differential action. The friction clutch assembly is contained between a separation plate fixed to the differential case and axially spaced from a side gear, and a thrust collar splined to one of axle shafts and movable in axial direction in order to actuate the friction clutch assembly. The friction clutch assembly includes alternating inner friction plates splined to the thrust collar, and outer friction plates non-rotatably coupled to the differential case. The friction clutch assembly is actuated by a selectively controllable actuator including an electrical motor, a reduction gearing and a ball-and-ramp actuator adapted to axially displace the thrust collar in response to rotation of the electrical motor. The differential assembly provides both limited slip and open differential capabilities.

27 Claims, 4 Drawing Sheets

ELECTRONICALLY CONTROLLED LIMITED SLIP DIFFERENTIAL ASSEMBLY

BACKGROUND OF THE INVENTION

1. Field of the Invention

The present invention relates to a differential assembly, and more particularly to a differential assembly for motor vehicles, having an electronically controlled friction clutch assembly providing both limited slip and open differential capabilities.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, these types of differentials known in the art as an open differentials, i.e. a differential without clutches or springs, are unsuitable in slippery conditions where one wheel experiences a much lower coefficient of friction than the other wheel; for instance, when one wheel of a vehicle is located on a patch of ice or mud and the other wheel is on dry pavement. In such a condition, the wheel experiencing the lower coefficient of friction loses traction and a small amount of torque to that wheel will cause a "spin out" of that wheel. Since the maximum amount of torque, which can be developed on the wheel with traction, is equal to torque on the wheel without traction, i.e. the slipping wheel, the engine is unable to develop any torque and the wheel with traction is unable to rotate. Thus, the necessity for a differential, which limits the differential rotation between the output shafts to provide traction on slippery surfaces is well known.

A number of methods have been developed to limit wheel slippage under such conditions. Prior methods of limiting slippage between the side gears and the differential casing use a frictional clutch mechanism, usually clutch plates splined to a side gear hub portion, and a bias mechanism, usually a spring, to apply an initial preload between the frictional clutch mechanism and the differential casing. By using a frictional clutch mechanism with an initial preload, for example a spring, a minimum amount of torque can always be applied to the wheel having traction, i.e. the wheel located on dry pavement. The initial torque generates gear separating forces which further engage the frictional clutch and develop additional torque. Such limited slip differentials are well known in the prior art.

The initial preload initiates the development of side gear separating forces which provide further braking action between the side gears and the differential casing. In general, gear separating forces are forces induced on any set of meshing gears by the application of torque to the gears and which forces tend to separate the gears. In a differential, the development of torque will create side gear separating forces which tend to move the side gears away from the pinion gears. On a surface having a low coefficient of friction, the initial preload creates contact and friction pressure between the differential casing and the clutch mechanism disposed between the side gears and the differential casing to allow the engine to develop an initial torque. This initiation of torque transfer induces gear separating forces on the side gears which tend to separate the side gears to further increase friction between the clutch mechanism and the casing. The increased friction pressure of the clutch allows more torque to be developed, thus further increasing the side gear separating forces and limiting the slippage between the side gears and the differential casing.

However, such preloaded clutches are usually always engaged, and thus are susceptible to wear, causing undesirable repair and replacement costs. Additionally, such clutch mechanisms usually employ spring mechanisms, which add to the cost and difficulty of manufacture. Additionally, such a preloaded clutch mechanism may lock the output shafts together in situations where differential rotation is necessary. For example, if the vehicle is making a turn when the wheels are sufficiently engaged on the road surface and a sufficient amount of torque is developed, the differential will tend to lock up the output shafts due to the action of the side gear separating forces created by the developed torque. This may occur, for example, during tight turns on surfaces with a low coefficient of friction. In such a case, even though differential rotation is required, the torque and side gear separating forces lock up the two output shafts causing either wheel to drag and slide along the road surface. This problem is evident in rear drive vehicles during tight turns, as the portion of the vehicle near the dragging wheel may tend to bounce up and down.

Another method of limiting slippage involves the use of a frictional clutch between the side gears and the differential casing based on the difference in rotational speeds between the two output shafts. The frictional clutch may be actuated by various hydraulic or electrical mechanisms, which may be external to the differential case or may be constructed of elements disposed inside the differential casing. However, such mechanisms usually are still susceptible to loading by gear separation forces and may lock the output shafts together in situations where differential rotation is necessary.

Thus, what is needed is a differential capable to provide the limited slip function only when required, i.e. limited slip when one wheel has lost traction, and perform as an open differential when sufficient torque is developed.

SUMMARY OF THE INVENTION

The present invention provides an improved electronically controlled differential assembly providing both limited slip and open differential capabilities.

The differential assembly in accordance with the preferred embodiment of the present invention includes a rotatable differential case forming housing a differential gearing rotatably supported in the case. and a pair of opposite side gears in meshing engagement with the differential gearing to permit differential rotation thereof. The differential assembly includes a friction disk clutch assembly disposed within the differential case and provided to lock the differential assembly. The friction clutch assembly includes a number of alternating outer friction plates non-rotatably coupled to the differential case and inner friction plates splined to a thrust collar disposed within the differential case coaxially to the side gears and adapted for loading the friction clutch plates when actuated. An annular separation plate is arranged within the differential case between the side gear and the friction clutch assembly. The separation plate is spaced from the side gear and non-rotatably secured to the differential case. Thus, the friction clutch assembly is confined in a space between the separation plate and the thrust collar. An electronic selectively controllable actuator assembly is provided for axially displacing the thrust collar in order to load the friction assembly when needed, thus providing the differential assembly with a limited slip function. On the other hand, when the clutch assembly is not actuated, the differential assembly of the present invention provides an open differential because a side gear separation force is not transmitted to the clutch assembly and does not affect a frictional pressure between the friction clutch plates and the thrust collar.

Therefore, the differential assembly in accordance with the present invention provides the limited slip function only when required, and performs as an open differential when sufficient torque is developed.

BRIEF DESCRIPTION OF THE DRAWINGS

Other objects and advantages of the invention will come apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
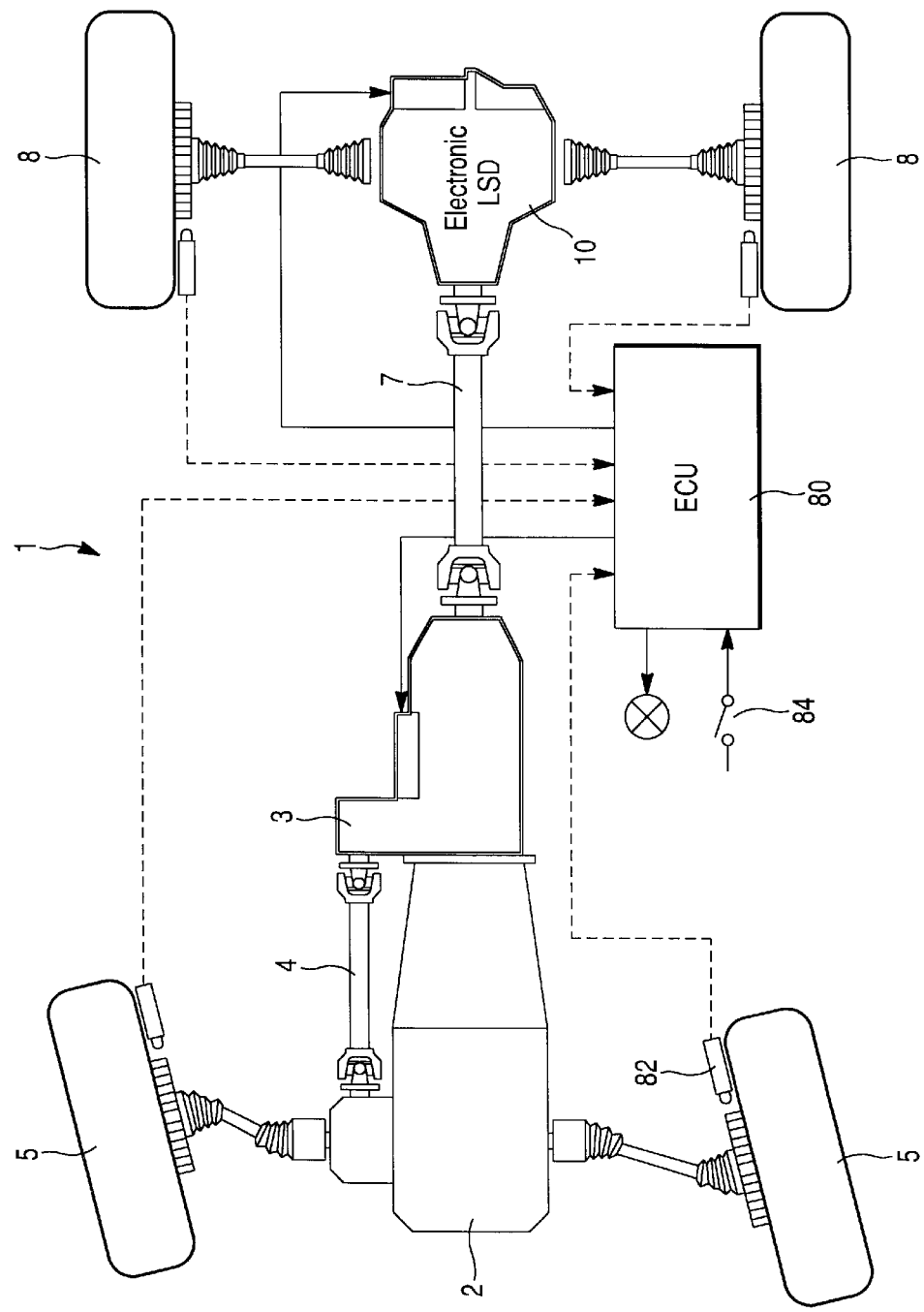
FIG. 1 is a schematic diagram showing a drivetrain of a four-wheel-drive vehicle including an electronically controlled limited slip differential assembly.

Referring first to FIG. 1 of the drawing, an electronically controlled limited slip differential (LSD) assembly 10 in accordance with the present invention is utilized in a four-wheel-drive (FWD) vehicle 1. The vehicle 1 comprises an engine 2 coupled to a four-wheel-drive transfer case 3 via a multi-speed change gear mechanism. The transfer case 3 is connected to a propeller shaft 4 for driving front wheels 5 of the vehicle 1, and to a propeller shaft 7 for driving rear wheels 9 of the vehicle 1 through the electronically controlled differential assembly 10. The differential assembly 10 is controlled by a control unit 80. The control is carried out by judging vehicle running conditions according to wheel speeds and whether the brakes are applied inputted into the control unit 80 from wheel speed sensors 82 and a brake switch 84.

Figure 2:
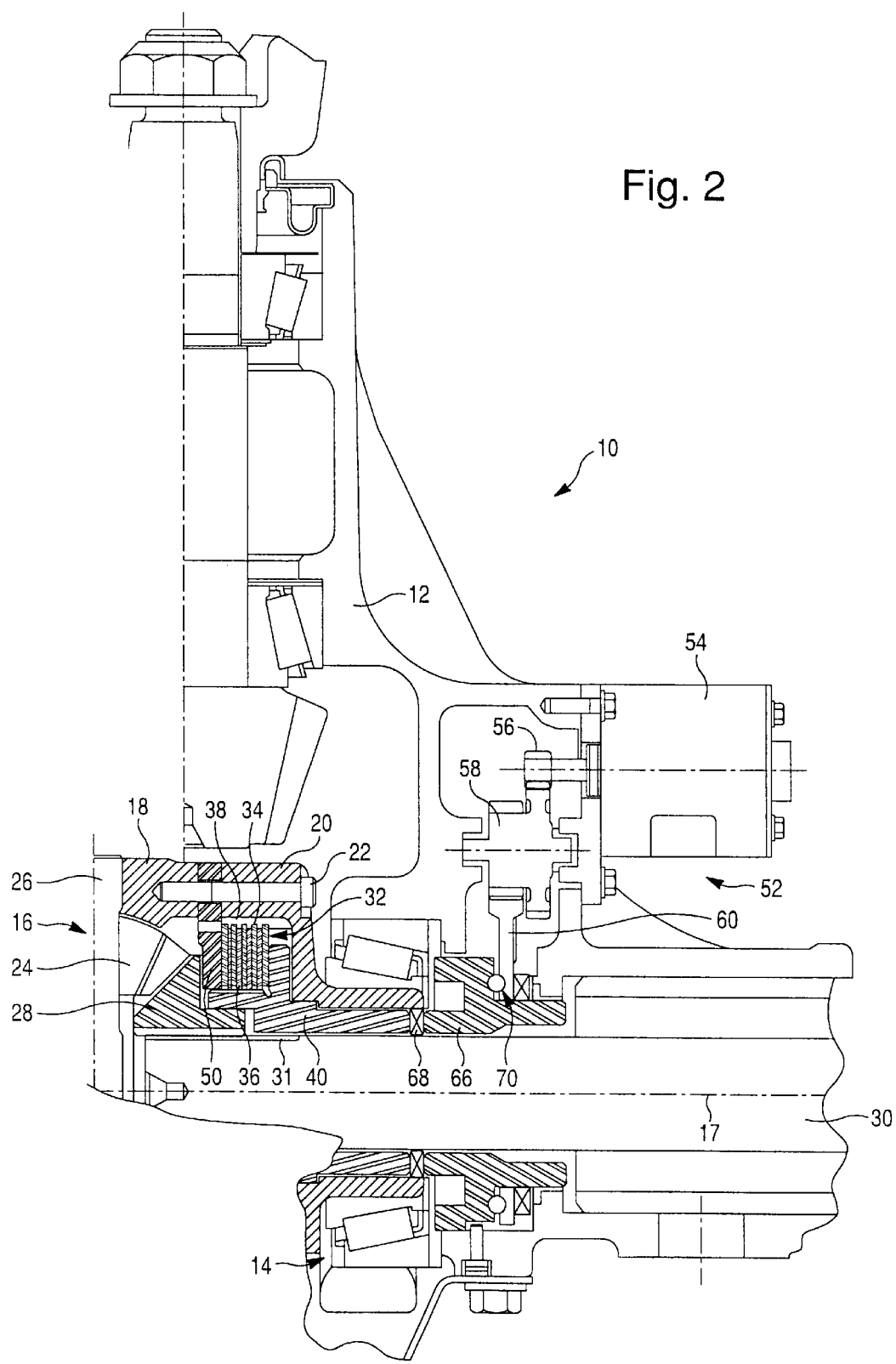
FIG. 2 is a sectional view of the electronically controlled limited slip differential assembly in accordance with the present invention.

FIG. 2 of the drawings illustrates in detail the preferred arrangement of the differential assembly 10 in accordance with the present invention. Reference numeral 16 defines a differential case rotatably supported in a differential carrier 12 through roller bearings 14, and defines an axis of rotation 17. The differential case 16 is made of two halves 18 and 20 fastened to each other, preferably by means of bolts 22.

The differential assembly is provided with a set of pinion gears 24 rotatably supported on a pinion shaft 26 secured to the differential case 16. The pinion gears 24 engage a pair of opposite side gears 28 adapted to rotate about the axis 17. The side gears 28 are splined to output axle shafts 30.

A friction clutch assembly 32 is provided within the differential case 16. The friction clutch assembly 32, well known in the prior art, includes sets of alternating outer friction plates 34 and inner friction plates 36. Conventionally, an outer circumference of the outer friction plates 34 is provided with projections that non-rotatably engages corresponding grooves 38 formed in the differential case 16. At the same time, the outer friction plates 34 are slideable in axial direction. The inner friction plates 36 are splined to an annular thrust collar 40 disposed within the differential case 16 and adapted to actuate the clutch assembly 32 by axially loading the friction plates 34 and 36.

Figure 3:
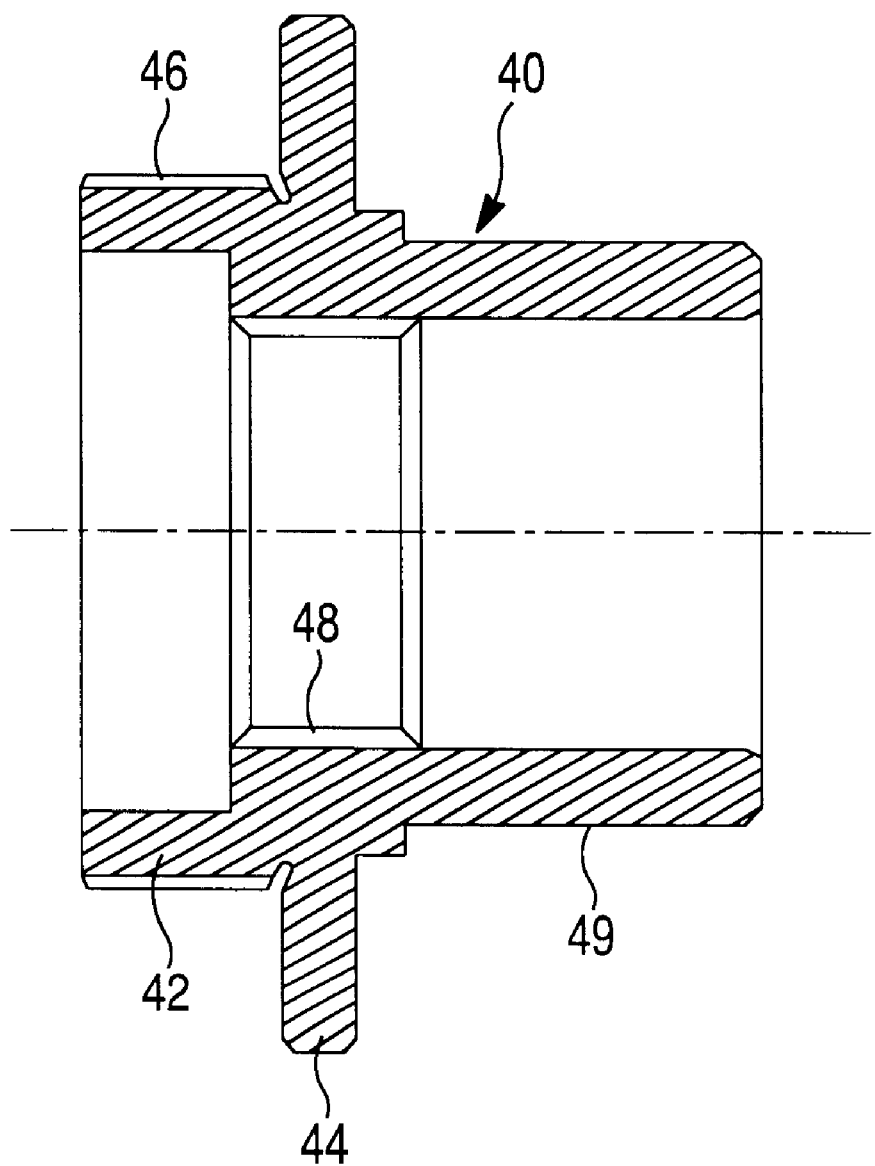
FIG. 3 is a sectional view of a thrust collar.

The thrust collar 40 is illustrated in detail in FIG. 3. The thrust collar 40 includes hub portion 42 and an annular thrust flange 44 disposed between the hub portion 42 and a cylindrical tail portion 49. The hub portion 42 is provided with splines 46 meshing with splines formed in a bore of the inner friction clutch plates 36. Thus, the inner friction clutch plates 36 are non-rotatably, but axially slidably mounted on the thrust collar 40. The annular thrust flange 44 is provided to axially load the friction clutch plates in order to actuate the friction clutch assembly 32. Furthermore, the thrust collar 40 has a splined central bore 48 in sliding engagement with a splined end 31 of the axle shaft 30, thus axially slidably, but non-rotatably coupling the thrust collar 40 to the axle shaft 30.

As further illustrated in FIG. 2, disposed within the differential case 16 is an annular separation plate 50 provided to separate the friction clutch assembly 32 from the side gear 28. Thus, in the differential assembly in accordance with the present invention, the friction clutch assembly 32 is confined in a space between the thrust collar 40 and the separation plate 50. The separation plate 50 is spaced from the side gear 28 by a free running clearance therebetween. Thus, as illustrated in FIG. 2, an axially endmost one of the friction clutch plates 34, 36 forming the friction clutch assembly 32 abuts the separation plate 50. At the opposite end of the friction clutch assembly 32, one of the friction clutch plates 34, 36 is engageable by the thrust collar 40. Therefore, gear separating forces generated during the differential rotation between the side gears 28, does not affect loading conditions of the friction clutch assembly 32, i.e. friction clutch engagement, thus providing a limited slip differential capable to perform as an open differential.

Figure 4:
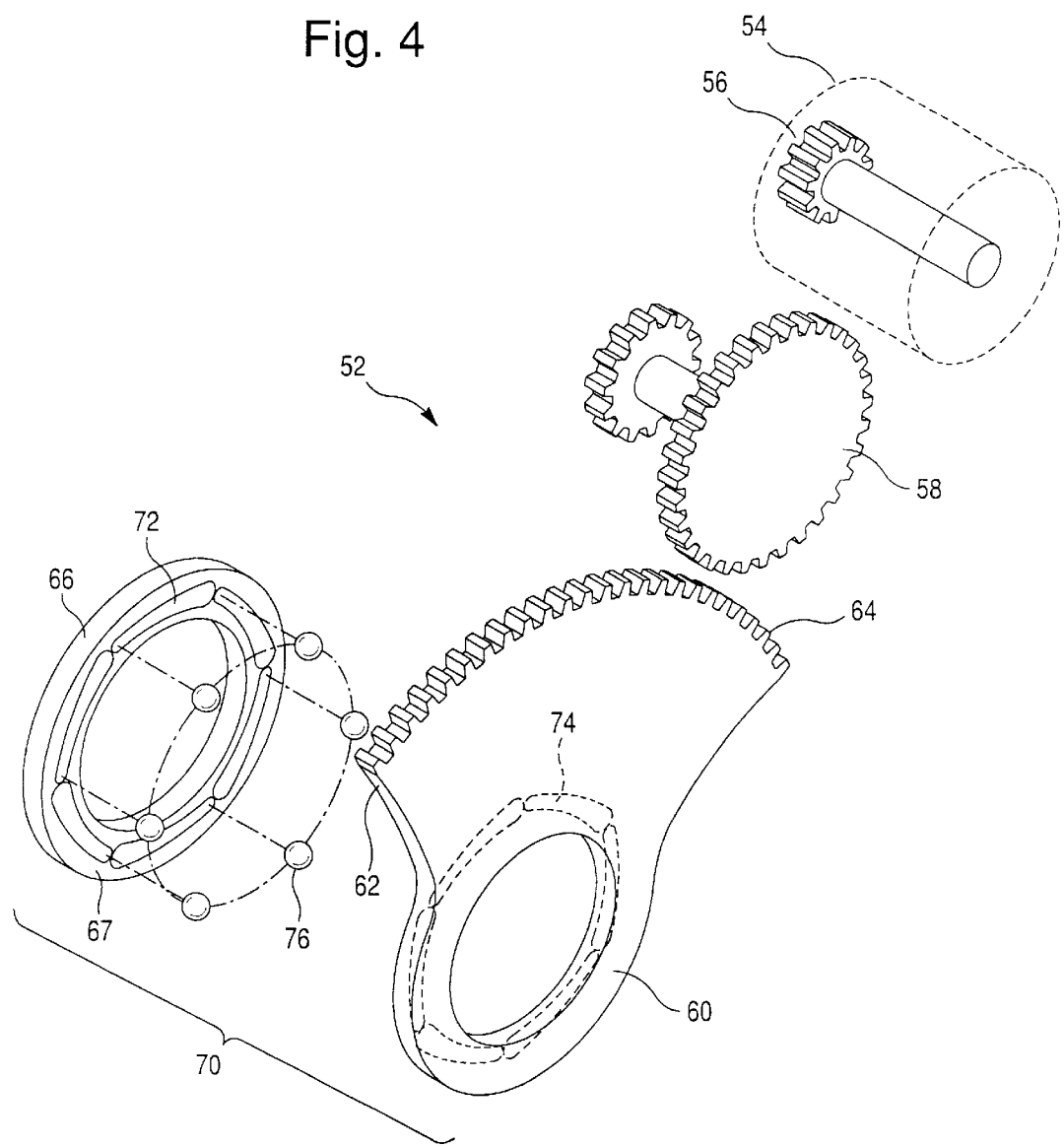
FIG. 4 is an exploded perspective view of an actuator assembly for the limited slip differential assembly.

In order to selectively actuate the friction clutch assembly 32 when necessary, the differential assembly 10 further comprises an actuator assembly 52 which is controllable by the electronic control unit 80 based on the data from the vehicle wheel sensors 82 and the brake switch 84, to cause the axial displacement of the thrust collar 40 in the direction of the friction clutch assembly 32. Various different actuator assemblies known in the prior art may be used in the differential assembly of the present invention, such as hydraulic, electromagnetic, mechanical, etc. A preferred embodiment of the actuator assembly 52 is described below with the reference to FIGS. 2 and 4.

The actuator assembly 52 comprises an electric servomotor 54 mounted to the differential carrier 12 and selectively controlled by the electronic control unit 80, as a driving means. The servomotor 54 drives an actuating ring 60, preferably through reduction gears 56 and 58. The actuating ring 60, rotatable but axially constrained, is provided with a radially extended arcuate portion 62 formed with external gear teeth 64 meshing with teeth of the reduction gear 58 so that the rotation of the servomotor 54 causes the angular displacement of the actuating ring 60, preferably less than 180°.

Furthermore, the preferred embodiment of the actuator assembly 52 of the present invention includes a pressure collar 66 provided to apply an axial force to the thrust collar 40 in order to load the friction clutch assembly 32. The pressure collar 66 is non-rotatably mounted to the differential carrier 12, while capable to move axially. An axial thrust bearing 68 is provided between the pressure collar 66 and the thrust collar 40 to reduce the friction because the thrust collar 40 rotates with the axle shaft 30. A pressure collar actuator 70 is disposed intermediate to the actuating ring 60 and the pressure collar 66. The pressure collar actuator 70 is provided to convert the angular displacement of the actuating ring 60 into axial displacement of the pressure collar 66.

Preferably, a ball-and-ramp actuator, well known to those skilled in the art, is employed. As illustrated in the FIG. 4, an annular radial surface 67 of the pressure collar 66 facing the actuating ring 60, is formed with a set of circumferentially extending grooves 72 of varying axial depth, facing complementary grooves 74 in the actuating ring 60, whose depth varies in the opposite circumferential sense. A corresponding number of balls 76 disposed between the pressure collar 66 and the actuating ring 60, one in each pair of the facing grooves 72 and 74. It will be appreciated that when the servomotor 54 moves the actuating ring 60 angularly relative to the pressure collar 66, the pressure collar 66 moves axially and causes the thrust collar 40 to frictionally load the clutch assembly 32.

Alternatively, a cam disc actuator including cooperative cam surfaces (not shown) provided on opposite sides of the actuating ring 60 and the pressure collar 66, may be used as the pressure collar actuator.

It will be appreciated that any other types of the pressure collar actuators known in the prior art may be employed.

Therefore, the electronically controlled differential assembly in accordance with the present invention represents a novel arrangement of the limited slip differential assembly that provides both limited slip and open differential capabilities.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A differential assembly, comprising:
   a differential carrier;
   a differential case rotatably supported in said carrier and defining an axis of rotation;
   two opposite output shafts extending from said carrier and rotatable about said axis relative to said differential case;
   two side gears arranged coaxially and rotatable relative to said differential case, and non-rotatably coupled to their respective output shafts;
   differential gears rotatably supported by said differential case and drivingly engaging said side gears to allow differential rotation thereof;
   a thrust collar arranged coaxially to one of said side gears, said thrust collar being rotatable relative to said differential case, and axially slidably and non-rotatably coupled to one of said output shafts so as to allow axial movement along said shaft;
   a friction clutch assembly including a number of alternating inner friction plates non-rotatably coupled to said thrust collar, and outer friction plates non-rotatably coupled to said differential case;
   said friction clutch assembly adapted to be axially loadable by said thrust collar to cause a frictional restriction of said differential rotation of said side gears; and
   a selectively controllable actuator assembly adapted for axially displacing said thrust collar in order to load said friction assembly.

2. The differential assembly as defined in claim 1, wherein said actuator assembly comprising:
   a rotary drive device;
   an actuating ring driven by said rotary drive device;
   a pressure collar adapted for axially displacing said thrust collar; and
   a pressure collar actuator adapted for axially displacing said pressure collar in response to the angular movement of said actuating ring.

3. The differential assembly as defined in claim 2, wherein said actuating ring is rotatable along a circumferential path of less than 180°.

4. The differential assembly as defined in claim 2, wherein said rotary drive device including a reduction gear and a drive motor.

5. The differential assembly as defined in claim 4, wherein said drive motor is an electric motor.

6. The differential assembly as defined in claim 2, wherein said pressure collar actuator is a ball-and-ramp actuator including cooperative surfaces provided on opposite sides of said actuating ring and said pressure collar and rolling members disposed therebetween.

7. The differential assembly as defined in claim 2, wherein said pressure collar actuator is a cam disc actuator including cooperative cam surfaces provided on opposite sides of said actuating ring and said pressure collar.

8. The differential assembly as defined in claim 1, wherein said thrust collar including:
   a hub portion non-rotatably connected to s aid inner friction plates of said friction assembly; and
   an annular thrust flange adapted to frictionally engage said friction plates for loading said friction clutch assembly.

9. The differential assembly as defined in claim 1, further including a separation plate fixed to said differential case and disposed intermediate to one of said side gears and said friction clutch assembly, said separation plate is spaced from said side gear and frictionally engages said friction plates.

10. The differential assembly as defined in claim 9, wherein said differential case including a first and second case halves, and said separation plate is non-rotatably secured between said case halves.

11. A differential assembly comprising:
    a differential carrier;
    a differential case rotatably supported in said carrier and defining an axis of rotation;
    two opposite output shafts extending from said carrier and rotatable about said axis relative to said differential case;
    two side gears arranged coaxially and rotatable relative to said differential case, and non-rotatably coupled to their respective output shafts;
    differential gears rotatably supported by said differential case and drivingly engaging said side gears to allow differential rotation thereof;

at least one thrust element, said thrust element being adapted for axial movement along said axis;

a friction clutch assembly including a number of alternating inner friction plates and outer friction plates non-rotatably coupled to said differential case;

a separation plate fixed to said differential case and disposed intermediate to one of said side gears and said friction clutch assembly, said separation plate is spaced from said side gear and adapted to frictionally engage said friction plates;

said friction clutch assembly adapted to be axially loaded by said thrust element to cause a frictional restriction of said differential rotation of said side gears; and a selectively controllable actuator assembly adapted for axially displacing said thrust element in order to load said friction assembly, wherein said thrust element is an annular thrust collar arranged coaxially to one of said side gears, said thrust collar is rotatable relative to said differential case, and axially slidably and non-rotatably coupled to one of said output shafts so as to allow axial movement along said shaft, wherein said inner friction plates are non-rotatably coupled to said thrust collar.

12. The differential assembly as defined in claim 11, wherein said thrust collar including:

a hub portion non-rotatably connected to said inner friction plates of said friction clutch assembly; and an annular thrust flange adapted to frictionally engage said friction plates for loading said friction clutch assembly.

13. The differential assembly as defined in claim 11, wherein said actuator assembly comprising:

a rotary drive device;

an actuating ring driven by said rotary drive device;

a pressure collar adapted for axially displacing said thrust collar; and a pressure collar actuator adapted for axially displacing said pressure collar in response to the angular movement of said actuating ring.

14. The differential assembly as defined in claim 13, wherein said actuating ring is rotatable along a circumferential path of less than 180°.

15. The differential assembly as defined in claim 13, wherein said rotary drive device including a reduction gear and a drive motor.

16. The differential assembly as defined in claim 15, wherein said drive motor is an electric motor.

17. The differential assembly as defined in claim 13, wherein said pressure collar actuator is a ball-and-ramp actuator including cooperative surfaces provided on opposite sides of said actuating ring and said pressure collar and rolling members disposed therebetween.

18. The differential assembly as defined in claim 13, wherein said pressure collar actuator is a cam disc actuator including cooperative cam surfaces provided on opposite sides of said actuating ring and said pressure collar.

19. The differential assembly as defined in claim 11, wherein said differential case including a first and second case halves, and said separation plate is non-rotatably secured between said case halves.

20. A differential assembly, comprising:

a differential carrier;

a differential case rotatably supported in said carrier and defining an axis of rotation;

two opposite output shafts extending from said carrier and rotatable about said axis relative to said differential case;

two side gears arranged coaxially and rotatable relative to said differential case, and non-rotatably coupled to their respective output shafts;

differential gears rotatably supported by said differential case and drivingly engaging said side gears to allow differential rotation thereof;

a thrust collar arranged coaxially and adjacent to one of said side gears, said thrust collar being rotatable relative to said differential case, and axially slidably and non-rotatably coupled to one of said output shafts so as to allow axial movement along said shaft;

a friction clutch assembly including a number of alternating inner friction plates non-rotatably coupled to said thrust collar, and outer friction plates non-rotatably coupled to said differential case;

a separation plate fixed to said differential case and disposed between one of said side gears and said friction clutch assembly, said separation plate is spaced from said side gear and provided to frictionally engage said friction plates;

said thrust collar provided to axially load said friction clutch assembly to cause a frictional restriction of said differential rotation of said side gears; and a selectively controllable actuator assembly adapted for axially displacing said thrust collar in order to load said friction assembly.

21. The differential assembly as defined in claim 20, wherein said thrust collar including:

a hub portion non-rotatably connected to said inner friction plates of said friction assembly; and an annular thrust flange adapted to frictionally engage said friction plates for loading said friction clutch assembly.

22. The differential assembly as defined in claim 20, wherein said actuator assembly comprising:

a rotary drive device;

an actuating ring driven by said rotary drive device;

a pressure collar adapted for axially displacing said thrust collar; and a pressure collar actuator adapted for axially displacing said pressure collar in response to the angular movement of said actuating ring.

23. The differential assembly as defined in claim 22, wherein said actuating ring is rotatable along a circumferential path of less than 180°.

24. The differential assembly as defined in claim 22, wherein said rotary drive device including a reduction gear and a drive motor.

25. The differential assembly as defined in claim 24, wherein said drive motor is an electric motor.

26. The differential assembly as defined in claim 22, wherein said pressure collar actuator is a ball-and-ramp actuator including cooperative surfaces provided on opposite sides of said actuating ring and said pressure collar and rolling members disposed therebetween.

27. The differential assembly as defined in claim 22, wherein said pressure collar actuator is a cam disc actuator including cooperative cam surfaces provided on opposite sides of said actuating ring and said pressure collar.

* * * * *